ates Patent Office 3,201,089
Patented Aug. 17, 1965

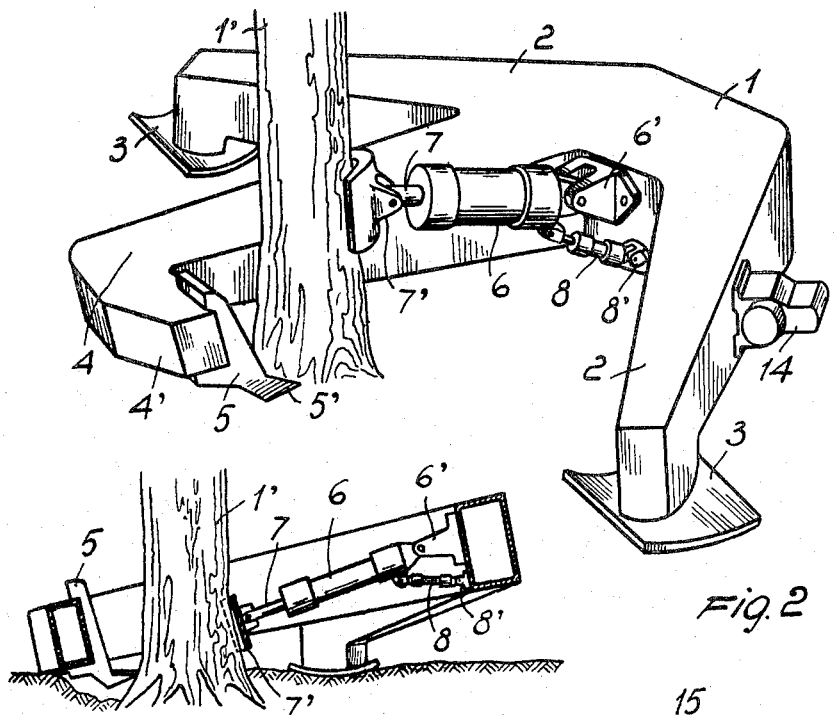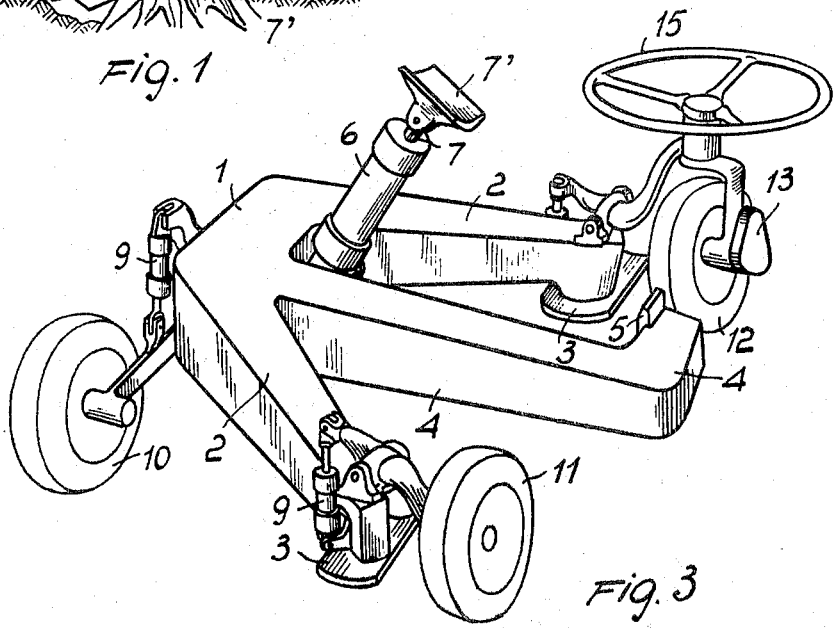

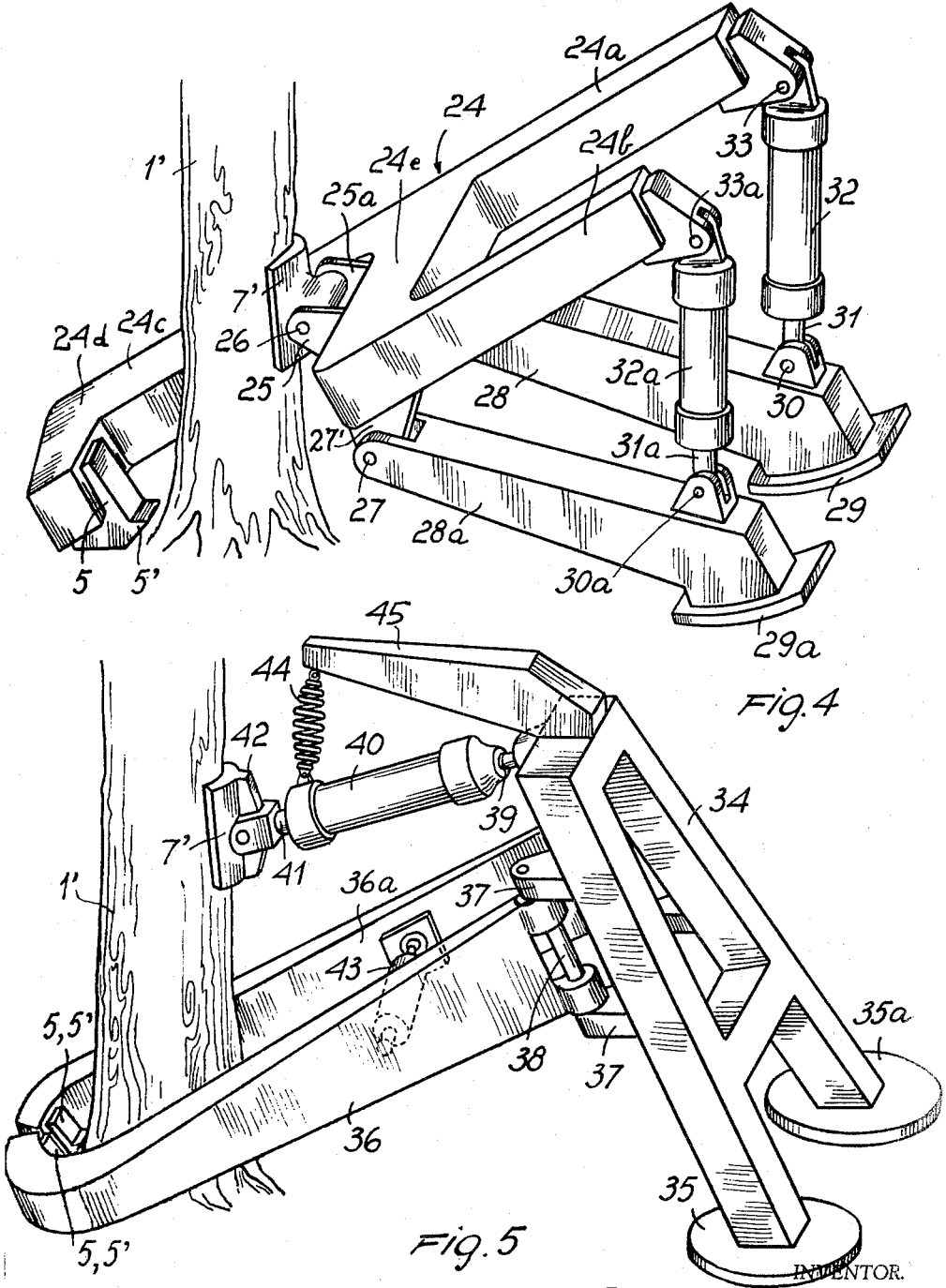

3,201,089
UPROOTING DEVICE
Romolo Napoletano, Piazza Vida 10, Cremona, Italy
Filed July 26, 1963, Ser. No. 298,530
4 Claims. (Cl. 254—124)

This invention relates to an uprooting device for trees and similar.

Various types of uprooting machines are known.

One type is based on the principle of uprooting the tree by acting thereon by means of a vertical thrust; this machine has, among other, the disadvantage that the tree is seized at the workable part of the tree-trunk, i.e. at a certain height from the ground, since it is necessary to place jacks or lifting devices under the point at which the trunk is grasped by the machine.

On account of the strength with which the trunk is seized, the tree is damaged at the workable part of the tree-trunk. Besides this, the overturning position of the tree is not determined by the vertical thrust so that it is necessary to provide special means which allow the tree to be overturned in the desired direction.

Another type of uprooting machine is based on the principle of acting on the tree by means of a transverse force acting at a given height from the ground. Besides damaging the tree-trunk in a workable part, in consideration of the height at which the transverse force has to act on the tree, this type of uprooting machine has the disadvantage consisting in the difficulty to find a bearing which will suffice to balance the strong horizontal reaction opposed by the tree itself.

These uprooting machines of the already known types, act either only with an overturning action on the tree or only with a vertical uprooting action on the latter.

The object of this invention is to provide an uprooting device which will act on the tree, exerting simultaneously an overturning and hoisting action thereon.

Another object of the invention is to have the bearing reaction on the ground directed in a vertical direction so as to allow the ground to support considerable loads without yielding and without the sliding of the bearing.

A further object of this invention is to provide a machine which allows the trees, to be uprooted from the ground together with good part of its roots, causing the tree to be laid down in a selected position.

Another object of this invention is to provide a machine for uprooting trees which causes no deformation of the tree trunk and which is made in such a way as to be capable of being adapted to any shape or size of the trunk without requiring any special handling, preparation or pre-setting, so that the operation itself is rapidly accomplished.

These and other objects which will appear more clearly from the description which follows are attained by a machine for uprooting trees, according to the invention, which comprises, a central structure carrying, rigidly connected therewith or hinged therewith with or without interposition of thrust means, a tooth member destined to act against the bottom part of the tree, a concave plate member destined to act on the tree-trunk at a given height thereof exerting a mainly horizontal thrust from the opposite side to the tooth member, and two supporting feet destined to act on the ground at the side of the plate member and exerting a thrust which is substantially vertical, a thrust means being provided to act on the concave plate member or on the tooth member or on the supporting feet, as well as power means actuating the aforesaid thrust means.

A number of embodiments of this invention will now be described more in detail with reference to the accompanying drawing given for illustrative and not limitative purposes and in which:

FIG. 1 shows a side view of the machine according to the invention, such view being partly in section, and shows the position of the machine during the first stage of operation.

FIG. 2 shows the machine according to this invention in a perspective view in the position of the second stage of operation.

FIG. 3 shows a perspective view of a machine according to this invention, provided with wheels to allow the machine to be moved from one place to another.

FIGS. 4 and 5 show two further embodiments of the machine in a diagrammatic perspective view.

With reference to FIGS. 1 and 2, the machine comprises a heavy-duty central supporting structure 1, approximately resembling the letter T and having two lateral arms 2 inclined with respect to the central arm 4 and having at the free ends thereof sole-plates 3. The position of these sole-plates 3 is at a distance from the free end of the central arm 4. The central arm 4 of the supporting structure 1 has at its hook-like, bent, free end 4' a member 5 fitted with a tooth 5'. A thrust member 6 is also secured on the central support 1. This thrust member is in the form of a hydraulic jack hinged on the lugs 6' fixed on the aforesaid supporting structure 1. The cylinder of the hydraulic jack 6, the piston 7 of which is pressed against the tree 1' through a plate member 7', can be rotated about the hinging points on lugs 6' by means of a second hydraulic jack 8 of a known type. Jack 8 is hinged at 8' on the aforementioned support structure 1. The aforesaid hydraulic jacks are actuated by a pumping motor unit 14 delivering pressure fluid to the jacks through nonrepresented flexible pipes.

Now, with reference to FIG. 3, the reference numerals 10, 11 and 12 indicate three wheels fitted by known means on the support structure 1 of the machine and on the free ends of the arms 2. These wheels can be lifted or lowered by actuating the hydraulic jacks 9, the controls of which are not shown in the figure, since they are of conventional type.

A handwheel 15 is also shown in FIG. 3. This handwheel is a steering device for steering the driving wheel 12 which is driven by a usual hydraulic motor device indicated by 13. Such a motor can also be fitted to the other two wheels.

When the machine is used to uproot trees, the first operation is that of placing the main jack 6 in such a position that it acts on the lower part of the tree-trunk 1' as shown in FIGURE 1. This operation is controlled by means of the auxiliary jack 8 through which the position of the main jack 6 is adjusted. It is clear that, before starting this thrust action on the tree to be uprooted, at least three wheels 11 and 12—if the machine is of the self-moving type—should be lifted in such a way that arms 2 rest on the ground by means of the sole-plates 3.

In this position tooth 5' is opposite to jack 6 which, owing to the action of piston 7 and plate member 7' abutting against the tree-trunk, will determine penetration of the bit of the tooth 5' into the base part of the trunk. After this first operation, the piston of the main jack 6 is caused to move backwards and, at this stage, if the machine in use is fitted with wheels, wheel 10 is also raised from the ground and jack 8 is caused to act on jack 6, causing it to rise towards a higher point on the tree-trunk, as shown in FIG. 2. In this new position, the main jack 6 will again exert its thrust in a decisive manner causing the tree 1' to be overturned.

During this stage it will be clear that the machine according to this invention acts by means of the tooth 5' in a point near the base of the tree opposite to the main jack 6 which acts through abutting plate 7' at a suitable height. Consequently the machine rests on the ground with both arms 2 which support a very considerable load. The ground counterthrust, which is vertical, will be transmitted to the tree through the machine and, consequently, the trunk will be subjected to a strong overturning couple and also to a considerable upward thrust. The combination of these two hoisting and overturning actions, cause the tree to fall in the desired direction and the roots to be extracted. When the operation is finished and the tree is released from the machine, which release is advisable to occur during the falling of the tree, wheels 10, 11 and 12 may again be caused to rest on the ground in such a way as to allow the machine to be moved quickly towards the next tree to be uprooted.

It is obvious that in operation, the described first stage, the position of which is shown in FIG. 1, may be omitted. Thus, it is possible to bring the device immediately in the uprooting position indicated in FIG. 2 thereby eliminating the preliminary penetration of tooth 5' into the tree, inasmuch as, during the operation of jack 6, such penetration occurs automatically on account of the counter reaction of the tree during the thrust of jack 6 against the tree.

The embodiments shown in FIG. 4 comprises a structure, generally indicated by 24, comprising three arms 24a–24b, 24c so arranged as to resemble letter *h*. The free end of arm 24c has a part 24d, bent at an angle towards the direction of the geometrical extension of arm 24b and almost parallel to cross piece 24e. The cross piece 24e joins arms 24a and 24c to the said arm 24b. On the mutually facing surfaces of portions 24d and 24e the toothed member 5–5' and, a pair of lugs 25 and 25a are secured respectively.

On lugs 25 and 25a the abutment plate 7' is hinged in 26. Other two lugs 27' are welded on the portion 24e and provide a hinge 27 for each end of the elongated elements 28 and 28a made in the form of supporting feet resting on the ground by means of plate members 29 and 29a provided at the other end thereof.

The feet member 28 and 28a have, above their resting points on the ground, lugs 30 and 30a, whereon the stems 31 and 31a of the pistons of corresponding hydraulic jacks 32 and 32a are hinged. The jacks 32 and 32a are articulated at 33 and 33a to the free end of arms 24a and 24b of the structure 24. In this way the counter-reaction of the hydraulic jacks 32 and 32a is mainly exerted in a vertical direction against the ground through the feet hinged to the structure.

The embodiment shown in FIG. 5 comprises, a structure 34 similar to the letter A fitted at the bottom with two plates 35 and 35a resting on the ground. This structure is, slightly inclined in respect of the vertical towards the operative side of the machine.

On the upwardly converging rod members of structure 34 in the form of the letter A and intermediate their ends two arms 36 and 36a are articulated by means of corresponding hinges. Such hinges are formed of lugs 37 and pins 38, the axes of which are substantially parallel to the corresponding converging rod members of structure 34.

The free end of the aforesaid arms 36 and 36a are bent towards one another so as to be able to surround the tree 1' therebetween. At the aforesaid bent ends, there are provided respective toothed members 5–5'. At the upper end of the A shaped structure 34 the cylinder of a hydraulic jack 40 is secured by means of a ball-pivot, while at the free end of the piston stem 41 of said hydraulic jack 40 an abutting plate member 7' is secured by means of a hinge 42.

According to this embodiment, in operation, the hydraulic jack 40 is directed towards the tree-trunk 1' and the two arms 36 and 36a embrace the tree-trunk and can be rotated towards and apart from one another by means of the hydraulic jack 43, in such a way as to first embrace and then release the tree when it has been felled.

Jack 40 is spring supported in a cantilevered position by means of a spring 44 fixed to an arm 45 which is rigidly fixed on the top of structure 34.

From the foregoing description it will be understood that in all embodiments, during the operation, the thrust plate 7' and the tooth 5, 5', acting at various heights of the tree, form a couple which tends to overturn the tree as a consequence of the action exerted by the jacks.

To balance such an active couple which is transmitted by reaction to the machine, a balancing couple builds up, which is determined by the vertical force transmitted by the sole-plates to the ground and by the equally vertical force directed in the opposite direction and built up at the bit 5' of tooth 5 while it is driven into the tree.

Actually, since the friction on the ground of sole-plates 3 or 29 and 35 is negligible, the machine must necessarily press in a vertical direction against the ground, while, in order to balance the rotating couple, the bit 5' driven into the three must, necessarily transmit an upward vertical force to the tree.

It is further to be noted that, instead of providing a jack 6 or 40 on the opposite side to tooth 5, it is possible to provide the plate 7' connected with the machine frame and jack 6 or 40 arranged on the same side as hook or bent part 4' or 24d of the frame, and the jack may carry tooth 5 on its front part. In this way the active thrust would be obtained at the tooth.

The foregoing description clearly shows that tooth 5' penetrates advantageously into the part close to the ground, i.e. into the trunk or event into the underground part of the tree so that the cut made therein does not damage the workable part of the tree, while abutting plate 7' does not damage the tree-trunk on which it acts.

The position of the controls for the operation of various jacks may vary according to requirements of the practical operation of the machine. It is also understood that dimensions and materials may be such as desired according to the requirements, while the single components may be replaced by others having equivalent technical features, without departing from the scope of the invention as described above and as claimed hereunder.

I claim:

1. An uprooting machine comprising a body, at least one arm extending from said body, said arm having a laterally extending free end, said free end being spaced from said body, defining a space therebetween for receiving a tree, at least two tree engaging means, a first of said tree engaging means being arranged on said free end and having a first engaging surface facing said body, a second of said tree engaging means being arranged on said body and having a second engaging surface facing said first engaging means, said first and said second engaging surfaces being at different levels in an operative position thereof, power means connected with at least one of said tree engaging means to move one of said engaging means towards the other engaging means and ground abutting sole-members on said body distant from said tree engaging means.

2. A machine according to claim 1, wherein said first of said tree engaging means being a tooth fixed on said free end, said power means being a hydraulic jack hinged on said body and having an actuating piston, and said second of said tree engaging means being an abutting plate hinged on said piston.

3. A machine according to claim 1, wherein said arm is hinged on said body and the machine comprises a further arm having a laterally extending free end and being hinged on said body and symmetrically arranged with respect to said arm, and wherein said first of said tree engaging means are teeth fixed on the free ends of said arm and said further arm, said power means is a hydraulic jack hinged on said body at a higher lever than said arm and said further arm, said hydraulic jack having an actuating piston, and said second of said tree engaging means is an abutting plate hinged on said piston.

4. An uprooting machine comprising a body having an arm extending therefrom and including a hook-like bent free end on said arm, a tooth on said free end and facing said body, an abutting plate member distant from said tooth and hinged on said body at a higher level than said tooth, a link member fixed on said body near said abutting plate and having at least one extremity projecting downwardly from said body, at least one elongated support member hinged with one end thereof on said extremity of said link member, at least one hydraulic jack hinged with one end thereof on said body at a point distant from said abutting plate and hinged with the other end thereof on the other end of said support member at an end thereof distant from said link member and at least one ground abutting sole member on said support member below the hinge connection of said support member with said hydraulic jack.

References Cited by the Examiner
UNITED STATES PATENTS 372,527  11/87  Foulke _____ 254—124 X WILLIAM FELDMAN, *Primary Examiner.*